(12) United States Patent
Brunhuber et al.

(10) Patent No.: US 9,897,002 B2
(45) Date of Patent: Feb. 20, 2018

(54) ACCUMULATOR SYSTEM COUPLED TO GAS TURBINES FOR INTAKE FLUID PREHEATING

(71) Applicant: Siemens Aktiengesellschaft, Munich (DE)

(72) Inventors: Christian Brunhuber, Auerbach (DE); Frank Strobelt, Nuremberg (DE); Gerhard Zimmermann, Hochstadt/Aisch (DE)

(73) Assignee: Siemens Aktiegesellschaft, Munich (DE)

( * ) Notice: Subject to any disclaimer, the term of this patent is extended or adjusted under 35 U.S.C. 154(b) by 100 days.

(21) Appl. No.: 14/895,043

(22) PCT Filed: May 6, 2014

(86) PCT No.: PCT/EP2014/059213
§ 371 (c)(1),
(2) Date: Dec. 1, 2015

(87) PCT Pub. No.: WO2014/195075
PCT Pub. Date: Dec. 11, 2014

(65) Prior Publication Data
US 2016/0341121 A1 Nov. 24, 2016

(30) Foreign Application Priority Data
Jun. 5, 2013 (DE) .......................... 10 2013 210 431

(51) Int. Cl.
*F02C 6/14* (2006.01)
*F02C 7/08* (2006.01)
(Continued)

(52) U.S. Cl.
CPC .................. *F02C 6/14* (2013.01); *F02C 7/08* (2013.01); *F02C 7/10* (2013.01); *F02C 7/32* (2013.01);
(Continued)

(58) Field of Classification Search
CPC ...... F02C 6/14; F02C 7/32; F02C 7/10; F05D 2260/42
See application file for complete search history.

(56) References Cited

U.S. PATENT DOCUMENTS 5,758,485 A * 6/1998 Frutschi ................ F01D 25/007
415/179
6,513,318 B1 * 2/2003 Wright ...................... F02C 3/34
60/39.511
(Continued)

FOREIGN PATENT DOCUMENTS

CA          2850241 A1    4/2013
DE    102004050182 A1    4/2006
(Continued)

*Primary Examiner* — Patrick Maines
(74) *Attorney, Agent, or Firm* — Beusse Wolter Sanks & Maire

(57) ABSTRACT

An accumulator system is coupled to gas turbines for storing thermal energy in a heat accumulator, having a charge circuit and a discharge circuit. The charge circuit has an electrically operated heat generation device which is configured for generating heat with the utilization of electrical energy. The charge circuit is configured for transferring the heat at least temporarily to the heat accumulator, in order to store the heat therein. The discharge circuit is configured to thermally condition a fluid by the heat from the heat accumulator, and to then guide the fluid to the intake side of a compressor of a gas turbine, wherein the charge circuit has a heat pump as heat generation device.

13 Claims, 2 Drawing Sheets

(51) Int. Cl.
*F02C 7/10* (2006.01)
*F02C 7/32* (2006.01)

(52) U.S. Cl.
CPC ...... *F05D 2220/32* (2013.01); *F05D 2260/42* (2013.01); *Y02E 20/14* (2013.01)

(56) References Cited

U.S. PATENT DOCUMENTS

| | | | | |
|---|---|---|---|---|
| 2008/0022683 | A1* | 1/2008 | Ohler | F02C 6/14 60/641.8 |
| 2010/0146976 | A1* | 6/2010 | Motakef | F02C 6/14 60/728 |
| 2010/0146981 | A1* | 6/2010 | Motakef | F01K 27/02 60/772 |
| 2011/0094236 | A1* | 4/2011 | Finkenrath | F02C 6/16 60/772 |
| 2015/0184593 | A1* | 7/2015 | Kraft | F02C 6/18 60/782 |

FOREIGN PATENT DOCUMENTS

| | | | | |
|---|---|---|---|---|
| JP | H1089798 A | 4/1998 | | |
| WO | WO 2007134466 A1 * | 11/2007 | | F01K 3/186 |

* cited by examiner

ACCUMULATOR SYSTEM COUPLED TO GAS TURBINES FOR INTAKE FLUID PREHEATING

CROSS REFERENCE TO RELATED APPLICATIONS

This application is the US National Stage of International Application No. PCT/EP2014/059213 filed May 6, 2014, and claims the benefit thereof. The International Application claims the benefit of German Application No. DE 102013210431.6 filed Jun. 5, 2013. All of the applications are incorporated by reference herein in their entirety.

FIELD OF INVENTION

The present invention relates to a gas turbine-coupled storage system for storing thermal energy in a heat accumulator for preheating a fluid fed to an intake side of a gas turbine and to a method for operating such a storage system.

BACKGROUND OF INVENTION

Such a storage system coupled to a gas turbine is known for instance from US 2011/0094236 A1. Said patent proposes storing compressed air in a cavern when excess electrical power is available. Before the process of storage in the cavern, heat is extracted from the compressed air, to feed this heat thereafter once again to the compressed air when the latter is removed from the cavern and supplied to a combustion chamber of a gas turbine.

In addition, US 2010/0146981 A1 teaches interconnection of a gas turbine which may thermally condition the intake air of a gas turbine to higher and lower temperatures using a heat exchanger. In this case, the heat exchanger may be provided with thermally conditioned water, which may also be removed from a cold tank for cooling purposes.

Owing to the increasing proportion of electrical energy supplied by fluctuating renewable energy sources in public power supply networks, gas-fired power stations or combined-cycle power stations are increasingly only used as backup power stations or for network stabilization. These power stations are operated in particular at times of lower energy provision by renewable energy sources, to ensure electrical power supply. As a result of this growing trend, these power stations are increasingly operated under partial load, i.e. in a load state for which the power stations are mostly not optimally designed. Owing to the non-optimal technical design of gas turbines, fuel-related efficiency in partial load operation is lower than under full load.

As a result of this disadvantage, it is desirable to improve gas turbines with regard to their flexibility in such a way as to increase partial load efficiency with regard to fuel consumption. Such a flexibility-enhancing measure should also make it possible when necessary to start up the gas turbine more quickly, over shorter start-up times. In this case it should be borne in mind that, during start-up operation, the gas turbine has likewise to be operated under partial load over a limited period before it can be run in the full load state which is advantageous with regard to efficiency. An improvement in partial load operation should however as far as possible also be undertaken in an energy-efficient manner, without solely using valuable primary energy.

Furthermore, it is also desirable to equip existing gas turbines for such improved flexible operation through simple structural modifications.

SUMMARY OF INVENTION

The object of the present invention is thus to propose a gas turbine system which allows improved partial load operation.

According to the invention, these objects underlying the invention are achieved by a gas turbine-coupled storage system as claimed and by a method for operating such a storage system as claimed.

In particular, these objects underlying the invention are achieved by a gas turbine-coupled storage system for storing thermal energy in a heat accumulator, having a charge circuit and a discharge circuit, the charge circuit being provided with an electrically operated heat generating device which is configured to generate heat using electrical energy, and the charge circuit being configured to transfer this heat at least in part to the heat accumulator, in order to store it therein, and the discharge circuit being configured to thermally condition a fluid using the heat from the heat accumulator in order then to feed said fluid to the intake side of a compressor of a gas turbine, wherein the charge circuit has a heat pump as heat generating device.

In addition, these objects underlying the invention are achieved by a method for operating such a storage system, as described above and indeed below, which comprises the following steps:—operating the heat generating device for generating heat and transferring this heat at least in part to the heat accumulator by means of the charge circuit;—buffering the heat in the heat accumulator;—transferring fluid thermally conditioned using heat from the heat accumulator to the intake side of the compressor of the gas turbine.

According to the invention, the gas turbine-coupled storage system thus provides a heat accumulator which may be charged with thermal energy using a charge circuit. The thermal energy here stems from an electrically operated heat generating device. Electrical operation of the heat generating device here proves particularly advantageous in this respect as, during charging or discharging of the heat accumulator, no energy has to be taken from a thermal power station circuit, whereby the energy generation efficiency in a power station could for example be adversely affected. Instead, the heat generating device generates thermal energy by converting electrical energy, which may then be buffered for a time using the heat accumulator in order to be able to use it at a later point in time as required. It has here proven particularly advantageous to convert electrical energy into heat in particular at a point in time when, for instance, there is an excess of electrical energy, for instance due to an oversupply of electrical energy in the power supply networks.

The thermal energy buffered in the heat accumulator may then be transferred to a fluid using the discharge circuit, said fluid then being fed to the intake side of the compressor of the gas turbine. Due to this preheating of the fluid introduced into the compressor of the gas turbine, the combustion temperature in the gas turbine may consequently be increased, whereby a higher useful energy yield is likewise to be expected. In this way, for example, the expansion of waste gas at a relatively high temperature in the expansion turbine permits enhanced performance with unchanged fuel consumption. Conversely, fuel to be burned in the gas turbine may be saved while performance remains the same. If, in addition, the thermal energy of the waste gas leaving the gas turbine after combustion is used in a further thermal process, the latter may also be operated at higher efficiency.

For instance, a steam part, coupled to the gas turbine, of a combined-cycle power station may operate with increased efficiency.

According to the invention, provision is moreover made for the charge circuit to have a heat pump as heat generating device. This heat pump is in particular configured to be provided with a heat supply for low temperature heat flows, in order to condition a heat flow in the low temperature range with regard to the heat content thereof. Such low temperature heat flows may for example be taken from district heating networks or from waste heat lines from an industrial plant. By additional conversion of electrical energy into thermal energy, the heat pump here significantly increases the heat content of the already present low temperature heat flow. Such heat pumps are typically distinguished by a high COP (coefficient of performance) value, which is at least 1.5. During operation of such a heat pump, an energy-related fuel saving is higher as a result of fluid preheating than would be possible merely with the electrically converted energy. In other words, the low temperature heat is also advantageously used by means of the heat pump, in addition to the converted electrical energy, for thermal conditioning of the fluid fed to the gas turbine.

Low temperature heat is here intended to relate to all those heat sources which have a temperature level of no more than 150° C.

It should be noted at this point that the fluid fed to the intake side of the compressor advantageously takes the form of air. This fluid may however for instance also take the form of a waste gas, which may be provided for afterburning. Further substances suitable for combustion in a gas turbine may likewise be contained in the fluid.

According to a first, particular embodiment of the invention, provision is made for the discharge circuit to be configured for conveying the fluid through the heat accumulator for thermal conditioning. Alternatively or indeed in addition, the charge circuit may also be configured to convey a working fluid, which may be identical to the fluid fed to the gas turbine, through the heat accumulator for heat extraction. Using a suitable heat exchanger, the working fluid could then transfer this absorbed heat at least in part back to the fluid which is being fed to the gas turbine. According to these embodiments, heat exchange between the heat accumulator and the fluid fed to the gas turbine thus proceeds directly or indirectly. Direct heat transfer is distinguished by high efficiency, whereas indirect heat transfer is particularly reliable and maintenance-friendly.

According to a further embodiment of the invention, provision is made for the charge circuit to comprise a fluid heat pump as the heat generating device, which comprises a fluidically interconnected compressor unit and expansion unit. In particular, the fluid heat pump takes the form of an air source heat pump, which may be open or indeed closed relative to the surrounding environment. In the open configuration, air is fed from the surrounding environment to the compressor unit, wherein, once compression and expansion of this air have been performed in the expansion unit, it may be released back to the surrounding environment. A heat exchanger is also typically connected between compressor unit and expansion unit, which heat exchanger is configured purposefully to remove the heat released during compression. Such compressor units and expansion units may for example be included in a gas turbine.

According to the embodiment, operation of the fluid heat pump requires a working fluid which is initially compressed by means of the compressor unit, wherein at the same time the fluid is heated adiabatically. This heat may be removed by means of the heat exchanger and buffered for a time in the heat accumulator. Then the working fluid treated thermally in this way is re-expanded using the expansion unit, wherein the fluid cools again.

The fluid heat pump may for example be included in a gas turbine which is operated as a heat pump at times when no electrical power has to be generated. In this case, the compressor unit and the expansion unit are driven by a generator which also allows motor-driven operation.

According to a further particularly advantageous aspect of the invention, provision is made for the discharge circuit to comprise a bypass line, which is configured to feed fluid introduced into the discharge circuit to the intake side of the compressor of the gas turbine bypassing the heat accumulator. This bypass line thus advantageously leads into a feed line, which feeds the fluid, which has been conditioned by the heat of the heat accumulator, to the gas turbine, and in this way ensures mixing of fluid which has and has not been thermally conditioned. The bypass line thus allows improved temperature control of the fluid fed to the gas turbine, wherein the temperature of the fluid may be adapted to the corresponding operating state of the gas turbine. In this respect, it is for example possible, depending on the load state of the gas turbine, in particular depending on the partial load state of the gas turbine, to feed fluid at an increased or reduced temperature level, depending on the mixing ratio of fluid which has and has not been thermally conditioned, to the compressor. Through this adaptation of the temperature level to the load state, the operating efficiency of the gas turbine averaged over different partial load states may be improved.

According to a further embodiment of the invention, provision is made for the charge circuit and the discharge circuit to be interconnected with the heat accumulator, wherein the heat accumulator comprises two flow ducts, in particular just one flow duct. The flow ducts in the heat accumulator may serve both for heat absorption into the heat accumulator and for heat release on discharge of the heat accumulator. If just one flow duct is provided in the heat accumulator, the heat accumulator may be made particularly cost-effective and maintenance-friendly, since both heat release and heat absorption may take place in the same flow duct or in the same flow ducts.

According to a first, particular embodiment of the method according to the invention, provision is made for the step of transferring thermally conditioned fluid to the intake side of the compressor of the gas turbine to take place when the gas turbine is operated under partial load, and in particular to take place only then. Partial load operation is typically present when a load range of 30 to 95% of the rated output is achieved. By supplying heat during such partial load operation, it is possible to increase operating efficiency, whereby the thermodynamic processes coupled to said operation, for instance for power generation, are also advantageously affected.

According to a further development of this concept according to the embodiment, provision is made for the transfer of thermally conditioned fluid to the intake side of the compressor to be open- or closed-loop controlled in such a way that, on reduction of the partial load output of the gas turbine, an increase in the temperature level of the thermally conditioned fluid passed to the intake side of the compressor is established. The partial load output here advantageously relates to the electrical partial load output. The temperature level is consequently adjusted as a function of the partial load output of the gas turbine. Since, in the case of a modified partial load, operating efficiency is also modified, suitable adjustment of the temperature level of the fluid passed to the intake side may result in an adapted efficiency increase for the different partial load states. In particular, individual adjustment of the temperature level may take place, depending on partial load state. In this way, overall efficiency increases, added together over operation in different partial load states.

According to a further development of this concept according to the embodiment, open- or closed-loop control of the temperature level proceeds by mixing fluid that has been thermally conditioned and fluid that has not been thermally conditioned before feeding the mixture to the intake side of the gas turbine, wherein in particular the fluid that has not been thermally conditioned is fed to the gas turbine via a bypass line. Mixing fluid that has been thermally conditioned with fluid that has not before feeding the mixture to the gas turbine is a simple measure for suitably adjusting the temperature level of the mixture.

The invention will be explained in greater detail below with reference to individual figures. It should here be noted that the figures should be understood as being merely schematic, and thus as not bringing about any restrictions with regard to the practicability of the invention.

It should furthermore be noted that the features mentioned in the figures are claimed both alone and in any desired combination, insofar as the combination according to the invention is capable of achieving the object of the invention.

It should moreover be noted that technical features which are provided with identical reference numerals have identical technical effects.

DETAILED DESCRIPTION OF INVENTION

Figure 1:
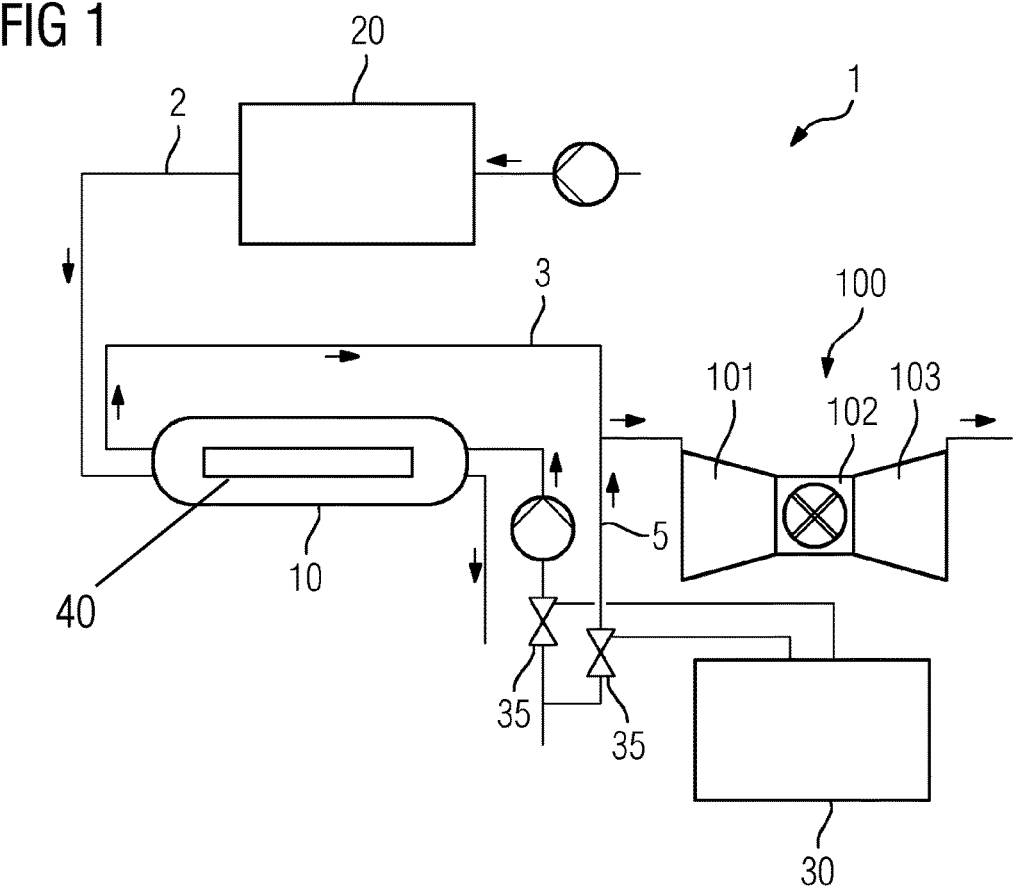
FIG. 1 is a schematic circuit diagram of a first embodiment of the storage system 1 according to the invention.

FIG. 1 shows a schematic circuit diagram of an embodiment of the gas turbine-coupled storage system 1 according to the invention, which comprises a charge circuit 2 and a discharge circuit 3 for thermally charging or discharging a heat accumulator 10. The charge circuit 2 in particular comprises a heat generating device 20, which during electrical operation may for instance transfer heat to a working fluid not provided with any further reference numerals, in order to feed this heat together with the working fluid to the heat accumulator 10. On thermal contact between the working fluid and the heat accumulator 10, heat transfer occurs, whereby the heat accumulator 10 may be thermally charged. According to the invention, the heat generating device 20 is embodied as a heat pump. Such a device in particular has a heat supply (not shown here) for low temperature heat flows, in order to use these in thermal conditioning of the fluid for the compressor 101. In an embodiment, the heat accumulator 10 includes just one flow duct 40.

On discharge of the heat accumulator 10 via the discharge circuit 3, fluid, likewise not provided with any further reference numerals, is passed to the heat accumulator 10, so as to be able to absorb thermal energy therein or therefrom. The thermal fluid thermally conditioned in this way is fed to the compressor 101 of the gas turbine 100 by means of the discharge circuit. Through the thermal conditioning, it is in particular possible to raise the temperature level during the combustion process in the combustion chamber 102, whereby an improvement in thermodynamic efficiency results in particular on partial load operation.

To be able suitably to adjust the temperature level of the fluid fed to the compressor 101, the present embodiment provides a bypass line 5 which makes it possible to convey fluid which is being conveyed in the discharge circuit 3 past the heat accumulator, in order to then mix it with thermally conditioned fluid before it is fed to the compressor 101 of the gas turbine 100. A suitable mixture may be achieved for instance by two adjusting means 35 inserted into the discharge circuit 3, which are suitably adjusted with an open- and/or closed-loop control unit 30. The adjusting means 35 make it possible to influence the flow quantities which are fed to the bypass line 5 or are to be fed to the heat accumulator 10 for heat exchange. The adjusting means 35 are particularly adjusted as a function of the partial load state of the gas turbine 100. In this respect, warm fluid may be increasingly fed for instance to the compressor 101 as the partial load output of the gas turbine 100 decreases.

Figure 2:
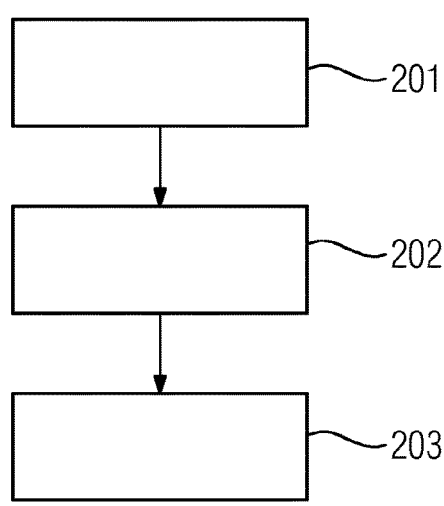
FIG. 2 shows an embodiment of the method according to the invention for operating such a storage system 1, in the form of a flowchart.

FIG. 2 is a flowchart of an embodiment of the method according to the invention for operating an above-described storage system 1, which comprises the following steps: —operating the heat generating device (20) for generating heat and transferring this heat at least in part by means of the charge circuit (2) to the heat accumulator (10) (first method step 201); —buffering the heat in the heat accumulator (10) (second method step 202); —transferring fluid thermally conditioned using the heat from the heat accumulator (10) to the intake side of the compressor (101) of the gas turbine (100) (third method step 203).

Figure 3:
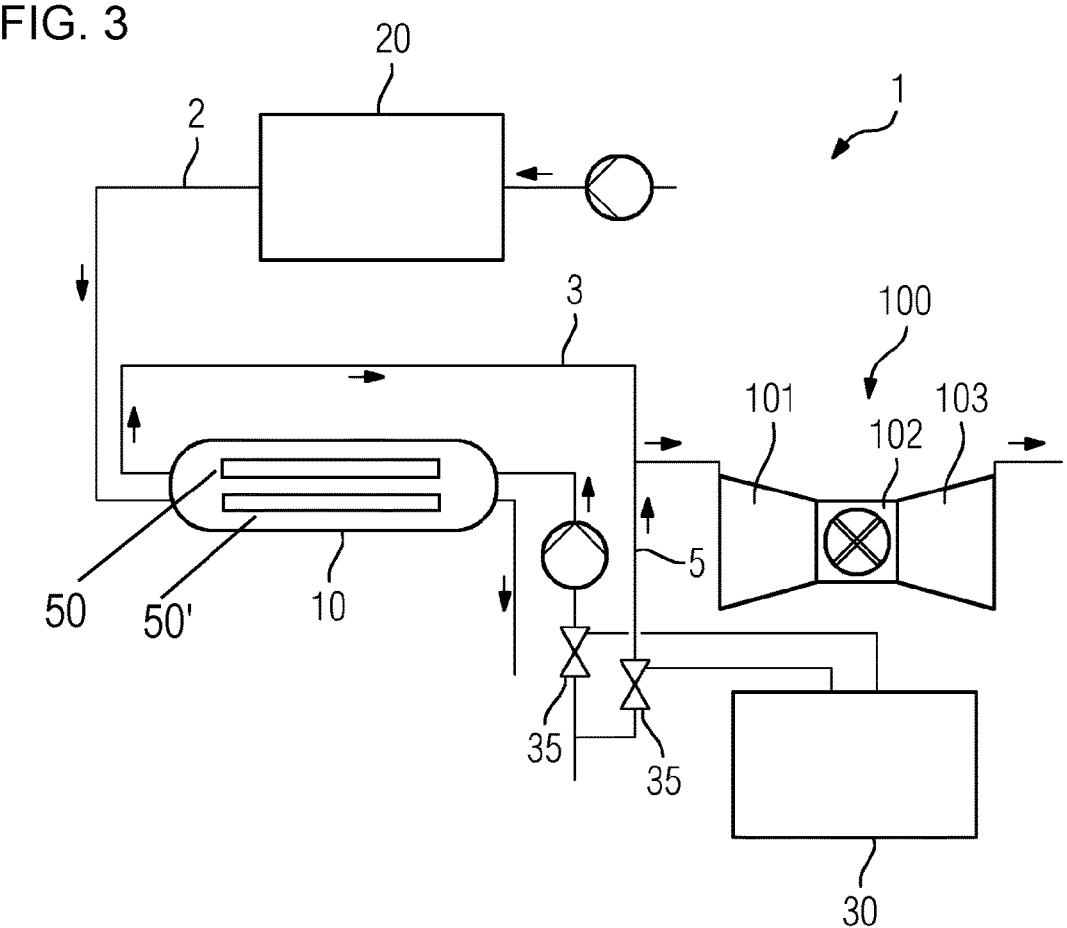
FIG. 3 is a schematic circuit diagram of a second embodiment of the storage system 1 according to the invention.

FIG. 3 shows the schematic circuit diagram of a second embodiment of the gas turbine-coupled storage system 1. In this embodiment, the heat accumulator 10 includes two flow ducts 50, 50'.

Further embodiments are revealed by the subclaims.

The invention claimed is:

1. A gas turbine-coupled storage system having a gas turbine for storing thermal energy in a heat accumulator, comprising:
  a charge circuit and a discharge circuit,
  the charge circuit comprising an electrically operated heat generating device which is configured to generate heat using electrical energy, and the charge circuit configured to transfer the heat at least in part to the heat accumulator, in order to store the heat therein, and
  the discharge circuit being configured to thermally condition a fluid using the heat from the heat accumulator in order then to feed said fluid to an intake side of a compressor of the gas turbine,
  wherein the discharge circuit comprises a heat accumulator feed leg connected to the heat accumulator and configured to deliver the fluid to the heat accumulator; a compressor feed leg connected to the heat accumulator and to the compressor and to deliver the fluid from the heat accumulator to the intake side of the compressor; and a bypass leg connected to the heat accumulator feed leg and to the compressor feed leg and configured to bypass the heat accumulator and deliver fluid that has not been thermally conditioned to the compressor feed leg, and
  wherein the charge circuit comprises a heat pump as the heat generating device.

2. The storage system as claimed in claim 1,
wherein the heat pump is configured to receive a heat supply for low temperature heat flows, in order to condition a heat flow in a low temperature range with regard to a heat content thereof.

3. The storage system as claimed in claim 1,
wherein the heat accumulator comprises two flow ducts.

4. A method for operating a storage system, as claimed in claim 1, the method comprising:
operating the heat generating device for generating the heat and transferring the heat at least in part by the charge circuit to the heat accumulator;
buffering the heat in the heat accumulator; and
transferring fluid that has been thermally conditioned using the heat from the heat accumulator to the intake side of the compressor of the gas turbine.

5. The method as claimed in claim 4,
wherein the step of transferring thermally conditioned fluid to the intake side of the compressor of the gas turbine takes place when the gas turbine is operated under partial load.

6. The method as claimed in claim 4,
wherein the transfer of thermally conditioned fluid to the intake side of the compressor is open- or closed-loop controlled such that, on reduction of a partial load output of the gas turbine, an increase in a temperature level of the thermally conditioned fluid passed to the intake side of the compressor is established.

7. The method according to claim 6,
wherein the open- or closed-loop control of the temperature level proceeds by mixing the fluid that has been thermally conditioned and the fluid that has not been thermally conditioned before feeding the mixture to the intake side of the gas turbine.

8. The method according to claim 7,
wherein the fluid that has not been thermally conditioned is fed to the gas turbine via a bypass line.

9. The method as claimed in claim 4,
wherein the step of transferring thermally conditioned fluid to the intake side of the compressor of the gas turbine takes place only when the gas turbine is operated under partial load.

10. The storage system as claimed in claim 1,
wherein the heat accumulator comprises just one flow duct.

11. The storage system as claimed in claim 1,
wherein the discharge circuit further comprises a bypass leg valve, and
wherein the storage system further comprises a control unit configured to control the bypass leg valve, thereby controlling a flow rate of fluid flowing in the bypass leg and to the compressor feed leg.

12. The storage system as claimed in claim 11,
wherein the discharge circuit further comprises a heat accumulator feed leg valve, and
wherein the control unit is further configured to control the heat accumulator feed leg valve, thereby controlling a flow rate of fluid flowing in the heat accumulator feed leg and to the heat accumulator.

13. The storage system as claimed in claim 12, wherein the control unit is configured to increase a temperature of fluid entering the intake side of the compressor as an output of the gas turbine decreases.

* * * * *